United States Patent
Ishida et al.

(10) Patent No.: US 12,502,338 B2
(45) Date of Patent: Dec. 23, 2025

(54) DENTAL GLASS IONOMER CEMENT

(71) Applicant: GC Corporation, Shizuoka (JP)

(72) Inventors: Ayaka Ishida, Tokyo (JP); Koji Tanaka, Tokyo (JP); Ayaka Fujimoto, Tokyo (JP); Daizaburo Mori, Tokyo (JP)

(73) Assignee: GC Corporation, Shizuoka (JP)

( * ) Notice: Subject to any disclaimer, the term of this patent is extended or adjusted under 35 U.S.C. 154(b) by 673 days.

(21) Appl. No.: 17/759,555

(22) PCT Filed: Oct. 29, 2020

(86) PCT No.: PCT/JP2020/040649
§ 371 (c)(1),
(2) Date: Jul. 27, 2022

(87) PCT Pub. No.: WO2021/152944
PCT Pub. Date: Aug. 5, 2021

(65) Prior Publication Data
US 2023/0099996 A1    Mar. 30, 2023

(30) Foreign Application Priority Data
Jan. 31, 2020 (JP) .................. 2020-015160

(51) Int. Cl.
| A61K 6/889 | (2020.01) |
| A61K 6/836 | (2020.01) |
| A61K 6/887 | (2020.01) |

(52) U.S. Cl.
CPC .............. *A61K 6/889* (2020.01); *A61K 6/836* (2020.01); *A61K 6/887* (2020.01)

(58) Field of Classification Search
CPC .................................................... A61K 6/889
See application file for complete search history.

(56) References Cited

U.S. PATENT DOCUMENTS

| | | | |
|---|---|---|---|
| 5,130,347 A | 7/1992 | Mitra | |
| 5,151,453 A | 9/1992 | Ibsen et al. | |
| 6,136,885 A | 10/2000 | Rusin et al. | |
| 2003/0055123 A1 | 3/2003 | Kawashima et al. | |
| 2003/0083400 A1* | 5/2003 | Jia | A61K 6/889 523/115 |
| 2006/0247330 A1 | 11/2006 | Takano et al. | |
| 2012/0077901 A1 | 3/2012 | Tanaka et al. | |
| 2014/0228474 A1* | 8/2014 | Qian | A61K 6/77 523/116 |
| 2018/0168938 A1* | 6/2018 | Schmücker | A61K 6/61 |
| 2021/0000698 A1 | 1/2021 | Uchida et al. | |

FOREIGN PATENT DOCUMENTS

| | | |
|---|---|---|
| JP | H03-047107 | 2/1991 |
| JP | 2000-513339 | 10/2000 |
| JP | 2003-012433 | 1/2003 |
| JP | 4794201 | 10/2011 |
| JP | 2012-072072 | 4/2012 |
| JP | 2021-100919 | 7/2021 |
| WO | 2015/045880 | 4/2015 |

OTHER PUBLICATIONS

Triethyleneglycol dimethacrylate GPS Safety Summary; Arkema; 2014. (Year: 2014).*
International Search Report for PCT/JP2020/040649 mailed on Dec. 28, 2020.
FUJIFILM Wako Pure Chemical Corporation, "Water-Based Curing Materials", retrived on May 19, 2023. https://specchem-wako.Fujifilm.com/jp/water-based-curing-materials/acrylamide-monomers.htm with English translation.

* cited by examiner

*Primary Examiner* — Michael F Pepitone
(74) *Attorney, Agent, or Firm* — IPUSA, PLLC

(57) ABSTRACT

One aspect of the present invention is: a dental glass ionomer cement including a first agent containing an ionomer glass powder; and a second agent containing a polycarboxylic acid polymer and water, wherein the first agent further contains a water-soluble compound represented by general formula (1):

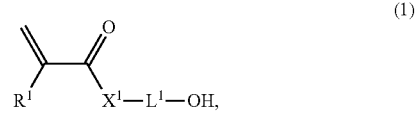

(1)

where $R^1$ is a hydrogen atom or a methyl group, $X^1$ is —O— or —NH—, and $L^1$ is an alkylene group, and a water-soluble compound represented by general formula (2):

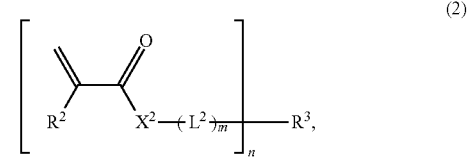

(2)

where $R^2$ is a hydrogen atom or a methyl group, $X^2$ is —O— or —NH—, $L^2$ is an alkyleneoxy group, $R^3$ is an n-valent organic group, m is an integer of 1 or more and 42 or less, and n is an integer of 2 or more and 6 or less.

2 Claims, No Drawings

DENTAL GLASS IONOMER CEMENT

CROSS-REFERENCE TO RELATED APPLICATIONS

The present application is a national stage application of International Application No. PCT/JP2020/040649, filed Oct. 29, 2020, which claims priority to Japanese patent application No. 2020-015160, filed Jan. 31, 2020. The contents of Japanese patent application No. 2020-015160 are incorporated herein by reference.

TECHNICAL FIELD

The present invention relates to a dental glass ionomer cement.

BACKGROUND ART

Conventionally, when treating caries, after forming a cavity, the cavity is filled with glass ionomer cement and hardened to restore the tooth.

A powder-liquid type glass ionomer cement typically has a first agent containing ionomer glass powder and a second agent containing a polycarboxylic acid polymer and water.

As the ionomer glass powder, for example, fluoroaluminosilicate glass powder is known.

Further, as a powder-liquid type glass ionomer cement, a resin-modified glass ionomer cement having a first agent further containing a radical polymerizable monomer is known (see, for example, Patent Literature 1).

CITATION LIST

Patent Literature

[PTL 1]
Japanese Laid-Open Patent Publication No. 2012-72072

SUMMARY OF INVENTION

Technical Problem

However, it is desired to further improve adhesiveness to the dentin and mechanical strength of the cured product of the powder-liquid type glass ionomer cement.

One aspect of the invention is to provide a dental glass ionomer cement that is excellent in adhesiveness to the dentin and in mechanical strength of the cured product.

Solution to Problem

One aspect of the present invention is: a dental glass ionomer cement including a first agent containing an ionomer glass powder; and a second agent containing a polycarboxylic acid polymer and water, wherein the first agent further contains a water-soluble compound represented by general formula (1):

[Chemical Formula 1]

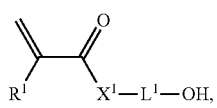

(1)

where $R^1$ is a hydrogen atom or a methyl group, $X^1$ is —O— or —NH—, and $L^1$ is an alkylene group, and a water-soluble compound represented by general formula (2):

[Chemical Formula 2]

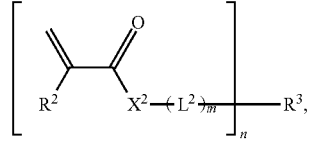

(2)

where $R^2$ is a hydrogen atom or a methyl group, $X^2$ is —O— or —NH—, $L^2$ is an alkyleneoxy group, $R^3$ is an n-valent organic group, m is an integer of 1 or more and 42 or less, and n is an integer of 2 or more and 6 or less.

Advantageous Effects of Invention

According to one aspect of the present invention, a dental glass ionomer cement that is excellent in adhesiveness to the dentin and in mechanical strength of the cured product can be provided.

DESCRIPTION OF EMBODIMENTS

Next, an embodiment for carrying out the present invention will be described.

Dental Glass Ionomer Cement

The dental glass ionomer cement according to the present embodiment includes: a first agent containing an ionomer glass powder; and a second agent containing a polycarboxylic acid polymer and water.

First Agent

The first agent further contains a water-soluble compound represented by general formula (1):

[Chemical Formula 3]

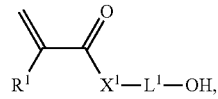

(1)

(In the formula, $R^1$ is a hydrogen atom or a methyl group, $X^1$ is —O— or —NH—, and $L^1$ is an alkylene group.)
and a water-soluble compound represented by general formula (2):

[Chemical Formula 4]

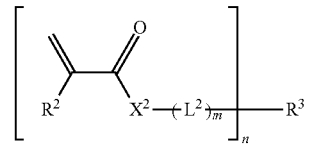

(2)

(In the formula, $R^2$ is a hydrogen atom or a methyl group, $X^2$ is —O— or —NH—, $L^2$ is an alkyleneoxy group, $R^3$ is an n-valent organic group, m is an integer of 1 or more and 42 or less, and n is an integer of 2 or more and 6 or less.).

As used herein and in the claims, a water-soluble compound means a compound having a solubility in water of 10 g/100 g $H_2O$ or more at 20° C.

Because the water-soluble compound represented by general formula (1) is a monofunctional radical polymerizable monomer having a hydroxyl group, the cured product of the dental glass ionomer cement according to the present embodiment has excellent adhesiveness to the dentin.

Examples of the alkylene group of $L^1$ in general formula (1) include a methylene group, an ethylene group, a propylene group, and the like.

Examples of the water-soluble compound represented by general formula (1) include hydroxyethyl acrylate, hydroxypropyl acrylate, hydroxyethyl methacrylate, hydroxypropyl methacrylate, hydroxymethyl acrylamide, hydroxyethyl acrylamide, hydroxypropyl acrylamide, and the like. The compound may be used in combination of two or more.

Because the water-soluble compound represented by general formula (2) is a multifunctional radical polymerizable monomer without hydroxyl group, the cured product of the dental glass ionomer cement according to the present embodiment does not easily absorb water and expand, and has excellent mechanical strength. In addition, because the water-soluble compound represented by general formula (2) has a high affinity with the polycarboxylic acid polymer, the cured product of the dental glass ionomer cement according to the present embodiment has excellent adhesiveness to the dentin. Furthermore, because the water-soluble compound represented by general formula (2) has a large molecular weight, the shrinkage stress during curing of the dental glass ionomer cement according to the present embodiment is reduced, and as a result, the cured product of the dental glass ionomer cement according to the present embodiment has excellent adhesiveness to the dentin.

Examples of the alkyleneoxy group of $L^2$ in general formula (2) include an ethylene oxy group, a propylene oxy group, and the like.

The n-valent organic group of $R^3$ in general formula (2) may contain heteroatoms or may not contain heteroatoms.

The water-soluble compound represented by general formula (2) is preferably a compound represented by general formula (2-1):

[Chemical Formula 5]

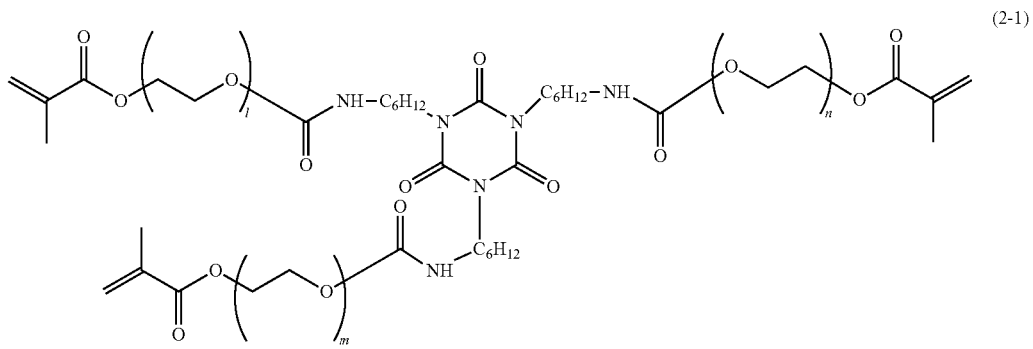

(2-1)

(In the formula, the sum of l, m, and n is 15 or more and 45 or less.)

and/or a compound represented by general formula (2-2):

[Chemical Formula 6]

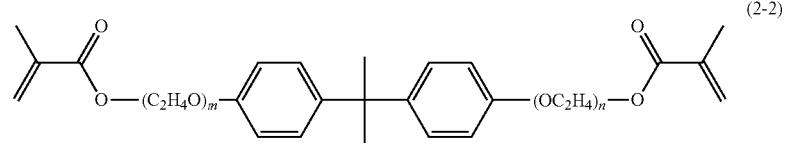

(2-2)

(In the formula, the sum of m and n is 20 or more and 40 or less.).

The molecular weight of the water-soluble compound represented by general formula (2) is preferably 1000 or more.

The first agent preferably further contains a water-insoluble compound represented by general formula (3):

[Chemical Formula 7]

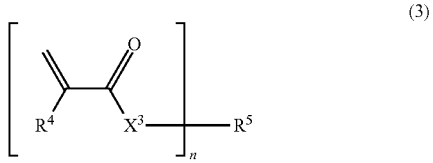

(3)

(In the formula, $R^4$ is a hydrogen atom or a methyl group, $X^3$ is —O— or —NH—, $R^5$ is an n-valent organic group, and n is an integer of 2 or more and 6 or less.)

Accordingly, the mechanical strength of the cured product of the dental glass ionomer cement of the present embodiment is improved.

Because the water-insoluble compound represented by general formula (3) is a multifunctional radical polymerizable monomer without a hydroxyl group and an alkyleneoxy group, the cured product of the dental glass ionomer cement according to the present embodiment is less likely to absorb water and expand, and the mechanical strength is improved.

Examples of the compound represented by general formula (3) include di-2-methacryloyloxyethyl-2,2,4-triethylhexamethylene dicarbamate, triethylene glycol dimethacrylate, glycerin dimethacrylate, and a compound represented by chemical formula (3-1):

[Chemical Formula 8]

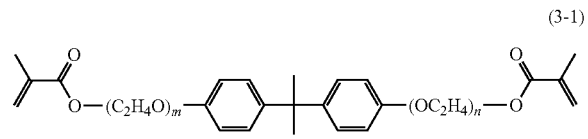

(3-1)

(In the formula, the sum of m and n is 10.). The compound may be used in combination of two or more.

The ratio of the mass of the compound represented by general formula (1) to the total mass of the compounds represented by general formulae (1) to (3) is preferably 5 to 80%, and more preferably 10 to 60%. When the ratio of the mass of the compound represented by general formula (1) to the total mass of the compounds represented by general formulae (1) to (3) is 5% or more, the adhesiveness to the dentin of the cured product of the dental glass ionomer cement according to the present embodiment is improved, and when the ratio is 80% or less, the mechanical strength of the cured product of the dental glass ionomer cement according to the present embodiment is improved.

The ratio of the mass of the compound represented by general formula (2) to the total mass of the compounds represented by general formulae (1) to (3) is preferably 2 to 30%, and more preferably 5 to 20%. When the ratio of the mass of the compound represented by general formula (2) to the total mass of the compounds represented by general formulae (1) to (3) is 2% or more, the adhesiveness to the dentin of the cured product of the dental glass ionomer cement according to the present embodiment is improved, and when the ratio is 30% or less, the mechanical strength of the cured product of the dental glass ionomer cement according to the present embodiment is improved.

The ionomer glass is not particularly limited as long as it is possible to react with the polycarboxylic acid polymer and be cured. Examples of the ionomer glass include fluoroaluminosilicate glass and the like.

The content of aluminum in the fluoroaluminosilicate glass is preferably 20 to 40% by mass, and more preferably 20 to 35% by mass, when converted into the amount of aluminum oxide ($Al_2O_3$).

The content of silicon in the fluoroaluminosilicate glass is preferably 20 to 50% by mass, and more preferably 20 to 45% by mass, when converted into the amount of silicon oxide ($SiO_2$).

The content of fluorine (F) in the fluoroaluminosilicate glass is preferably 1 to 30% by mass, and more preferably 3 to 20% by mass.

The content of phosphorus in the fluoroaluminosilicate glass is preferably 0 to 15% by mass, and more preferably 1 to 10% by mass, when converted into the amount of phosphorus (V) oxide ($P_2O_5$).

The content of calcium (Ca) in the fluoroaluminosilicate glass is preferably 0 to 40% by mass, and more preferably 0 to 30% by mass, when converted into the amount of calcium oxide (CaO).

The content of strontium (Sr) in the fluoroaluminosilicate glass is preferably 0 to 40% by mass, and more preferably 0 to 30% by mass, when converted into the amount of strontium oxide (SrO).

The total content of calcium and strontium in the fluoroaluminosilicate glass is preferably 15 to 40% by mass, and more preferably 15 to 30% by mass, when converted into calcium oxide (CaO) and strontium oxide (SrO), respectively.

The ionomer glass powder is preferably surface treated with a silane coupling agent having a polymerizable group.

Examples of the silane coupling agent having a polymerizable group include γ-methacryloyloxy propylmethyldimethoxysilane, γ-methacryloyloxy propyltrimethoxysilane, γ-methacryloyloxy propylmethyldiethoxysilane, γ-methacryloyloxy propyltriethoxysilane, and the like.

The first agent may further contain a polymerization inhibitor.

Examples of the polymerization inhibitor include dibutyl hydroxytoluene, 6-tert-butyl-2,4-xylenol, and the like.

Second Agent

The polycarboxylic acid polymer is not particularly limited, and for example, a homopolymer or copolymer of α,β-unsaturated carboxylic acid may be used.

Examples of the α,β-unsaturated carboxylic acid include acrylic acid, methacrylic acid, 2-chloroacrylic acid, 3-chloroacrylic acid, aconitic acid, mesaconic acid, maleic acid, itaconic acid, fumaric acid, glutaconic acid, citraconic acid, and the like.

The polycarboxylic acid polymer may also be a copolymer of the α,β-unsaturated carboxylic acid and a monomer capable of copolymerizing with the α,β-unsaturated carboxylic acid.

Examples of the monomer capable of copolymerizing with the α,β-unsaturated carboxylic acid include acrylamide, acrylonitrile, methacrylic acid ester, acrylic acid salts, vinyl chloride, allyl chloride, vinyl acetate, and the like.

In this case, the ratio of the α,β-unsaturated carboxylic acid to the monomer constituting the polycarboxylic acid polymer is preferably 50% by mass or more.

The polycarboxylic acid polymer is preferably a homopolymer or copolymer of acrylic acid or itaconic acid.

At least a part of the polycarboxylic acid polymer may be a powder.

The second agent preferably further contains a filler.

The filler may be either an organic filler or an inorganic filler, but preferably the filler is an inorganic filler.

The material constituting the inorganic filler is not particularly limited as long as it is a material that does not react with the polycarboxylic acid polymer and does not cure. Examples of the material include silica, barium glass, borosilicate glass, titania, barium sulfate, and the like. The material may be used in combination of two or more.

As a filler other than the above, it is also possible to use an organic-inorganic composite filler obtained by polymerizing a composition containing an inorganic filler and a monomer and then pulverizing the composition.

The filler is preferably surface treated with a silane coupling agent having a polymerizable group.

Examples of the silane coupling agent having a polymerizable group include γ-methacryloyloxy propylmethyldimethoxysilane, γ-methacryloyloxy propyltrimethoxysilane, γ-methacryloyloxy propylmethyldiethoxysilane, γ-methacryloyloxy propyltriethoxysilane, and the like.

The first agent and/or the second agent preferably further contain a polymerization initiator.

Examples of the polymerization initiator include sodium benzenesulfinate, L-cysteine hydrochloride, and the like.

The second agent may further contain a pH adjusting agent.

Examples of the pH adjusting agent include tartaric acid, citric acid, and the like.

EXAMPLE

Hereinafter, examples of the present invention will be described, but the present invention is not limited to the examples.

Preparation of Filler

Using an automatic mortar, 100 parts by mass of anhydrous silicic acid powder and 2 parts by mass of a 50% by mass ethanol solution of γ-methacryloyloxy propyltrimethoxysilane were mixed, and then heated at 130° C. for 2 hours to obtain a filler (A).

Preparation of Second Agent (A)

20 parts by mass of the filler (A), 70 parts by mass of 50% by mass polyacrylic acid aqueous solution, 8 parts by mass of tartaric acid, and 2 parts by mass of L-cysteine hydrochloride were mixed to obtain a second agent (A) in paste form.

Preparation of Second Agent (B)

A second agent (B) in paste form was obtained in the same manner as the second agent (A), except that sodium benzenesulfinate was used instead of L-cysteine hydrochloride.

Preparation of Ionomer Glass Powder (A)

A raw material composition consisting of 21 parts by mass of aluminum oxide powder, 44 parts by mass of anhydrous silicic acid powder, 12 parts by mass of calcium fluoride powder, 14 parts by mass of calcium phosphate powder, and 9 parts by mass of strontium carbonate powder was sufficiently mixed, held in a high temperature electric furnace at 1200° C. for 5 hours to melt, and then cooled to obtain a fluoroaluminosilicate glass. Next, the fluoroaluminosilicate glass was pulverized for 10 hours using a ball mill and then passed through a 200 mesh (ASTM) sieve to obtain a fluoroaluminosilicate glass powder (A).

Using an automatic mortar, 100 parts by mass of the fluoroaluminosilicate glass powder (A) and 2 parts by mass of a 50% by mass ethanol solution of γ-methacryloyloxy propyltrimethoxysilane were mixed, and then heated at 130° C. for 2 hours to obtain an ionomer glass powder (A).

Preparation of Ionomer Glass Powder (B)

An ionomer glass powder (B) was obtained in the same manner as the ionomer glass powder (A), except that a raw material composition consisting of 22 parts by mass of aluminum oxide powder, 43 parts by mass of anhydrous silicic acid powder, 12 parts by mass of calcium fluoride powder, 15 parts by mass of calcium phosphate powder, and 8 parts by mass of strontium carbonate powder was used.

Preparation of Ionomer Glass Powder (C)

An ionomer glass powder (C) was obtained in the same manner as the ionomer glass powder (A), except that a raw material composition consisting of 23 parts by mass of aluminum oxide powder, 41 parts by mass of anhydrous silicic acid powder, 10 parts by mass of calcium fluoride powder, 13 parts by mass of calcium phosphate powder, and 13 parts by mass of strontium carbonate powder was used.

Examples 1 to 6, Comparative Examples 1 to 6

Ionomer glass powder, a water-soluble compound represented by general formula (1), a water-soluble compound represented by general formula (2), a water-insoluble compound represented by general formula (3), and a polymerization inhibitor were mixed in the formulations [% by mass] described in Table 1 to obtain a first agent in paste form.

The obtained first agent and the second agent (see Table 1) were combined to obtain a glass ionomer cement.

The abbreviations in Table 1 are defined as follows.

HEMA: hydroxyethyl methacrylate

HEAA: hydroxyethyl acrylamide

BPE-1300N: EO-modified bisphenol A dimethacrylate (compound represented by general formula (2-2); m+n=30) (manufactured by Shin-Nakamura Chemical Co., Ltd.)

UA-7100: isocyanuric acid EO-modified trimethacrylate (compound represented by general formula (2-1); l+m+n=27) (manufactured by Shin-Nakamura Chemical Co., Ltd.)

UDMA: di-2-methacryloxyethyl-2,2,4-triethylhexamethylene dicarbamate

TEGDMA: triethylene glycol dimethacrylate

GDMA: glycerin dimethacrylate

BPE-500: EO-modified bisphenol A dimethacrylate (compound represented by general formula (2-2); m+n=10) (Shin-Nakamura Chemical Co., Ltd.)

BPE-900: EO-modified bisphenol A dimethacrylate (compound represented by general formula (2-2); m+n=17) (Shin-Nakamura Chemical Co., Ltd.)

BHT: dibutyl hydroxytoluene

The water solubility and water insolubility of the compounds represented by general formulae (1) to (3) were determined as follows.

Water Solubility, Water Insolubility 4 g of distilled water and 0.4 g of a sample were sufficiently stirred at 20° C., allowed to stand for 30 minutes, and then visually observed. When white turbidity and biphasic separation were not observed, it was judged to be water soluble. When white turbidity or biphasic separation was observed, it was judged to be water insoluble.

Next, adhesiveness to the dentin and flexural strength of the cured product of the glass ionomer cement were evaluated.

Adhesiveness to Dentin of Cured Product

A kneaded product of glass ionomer cement obtained by kneading the first agent and the second agent at a mass ratio of 1:1 was used as a sample. The adhesiveness to the dentin of the cured product was evaluated.

Specifically, the evaluation was performed as follows. The labial surface of the crown of the bovine tooth from which the tooth root was removed was polished with a water-resistant abrasive paper #120 to expose the dentin. Then, a fluororesin seal having a hole with a diameter of 3 mm was attached to the dentin to define the applied area of the test surface, and then the sample was applied to the test surface. Then, a stainless steel round bar having a diameter of 10 mm, whose applied surface was sandblasted in advance, was pressed against the test surface and then pressed with a load of 10 N to obtain a test piece. Next, after storing the test piece in an atmosphere of 37° C. and 95% RH for 1 hour, the test piece was immersed in water at 37° C. and stored, and 24 hours after the start of preparing the test piece, a tensile adhesiveness test was performed to evaluate the adhesiveness to the dentin of the cured product. That is, after setting the test piece on the autograph (manufactured by Shimadzu Corporation), a tensile load was applied perpendicularly to the test surface, and the maximum load until the test piece broke was recorded. The tensile bonding strength of the test piece was calculated by dividing the maximum load by the applied area.

The adhesiveness to the dentin of the cured product was determined according to the following criteria.
- Excellent: The tensile bonding strength of the test piece was 6 MPa or more.
- Good: The tensile bonding strength of the test piece was 5 MPa or more and less than 6 MPa.
- Poor: The tensile bonding strength of the test piece was less than 5 MPa.

Flexural Strength of Cured Product

A kneaded product of glass ionomer cement obtained by kneading the first agent and the second agent at a mass ratio of 1:1 was used as a sample. The flexural strength of the cured product was evaluated according to ISO 9917-2:2017 Annex C.

Specifically, the evaluation was performed as follows. A sample was filled in a stainless steel mold having a size of 25 mm×2 mm×2 mm, and then sandwiched between stainless steel plates via a plastic film and fixed with a clamp. The sample was cured by storing it in an atmosphere of 37° C. and 95% RH for 1 hour. Then, after removing the clamp, the plastic film was removed and the test piece was removed from the mold. After polishing the test piece with water-resistant abrasive paper #320 to remove burrs, the test piece was stored in water at 37° C., and a flexural test was performed 24 hours after the start of preparing the test piece. That is, after installing the test piece on the autograph (manufactured by Shimadzu Corporation), a flexural test was performed under the condition of a crosshead speed of 1 mm/min, and the flexural strength of the cured product was evaluated. Immediately before performing the flexural test, the test piece was taken out of the water and the dimensions of the test piece were measured using a micrometer.

The flexural strength of the cured product was determined based on the following criteria.
- Excellent: The flexural strength of the test piece was 40 MPa or more.
- Good: The flexural strength of the test piece was 35 MPa or more and less than 40 MPa.
- Poor: The flexural strength of the test piece was less than 35 MPa.

Table 1 describes the evaluation results of adhesiveness to the dentin and flexural strength of the cured product of the glass ionomer cement.

TABLE 1

| | | EXAMPLE | | | | | |
|---|---|---|---|---|---|---|---|
| | | 1 | 2 | 3 | 4 | 5 | 6 |
| | | FORMULATION OF FIRST AGENT [% BY MASS] | | | | | |
| IONOMER GLASS POWDER | A | 70 | | | 70 | 70 | 70 |
| | B | | 67 | | | | |
| | C | | | 70 | | | |
| WATER-SOLUBLE COMPOUND REPRESENTED BY GENERAL FORMULA (1) | HEMA | 4.995 | 14.988 | 7.992 | 6.994 | 6.994 | |
| | HEAA | | | | | | 7.992 |
| WATER-SOLUBLE COMPOUND REPRESENTED BY GENERAL FORMULA (2) | BPE-1300N | 2.997 | 1.998 | 2.997 | | | 1.998 |
| | UA-7100 | | | | 1.998 | 1.998 | |
| WATER-SOLUBLE COMPOUND | UDMA | 4.995 | 4.996 | 4.995 | 4.996 | 4.996 | 4.995 |
| | TEGDMA | 4.995 | | 3.996 | 5.989 | | |

TABLE 1-continued

| | | | | | | | |
|---|---|---|---|---|---|---|---|
| REPRESENTED BY GENERAL FORMULA (3) | GDMA | | 5.989 | | | 5.989 | 4.995 |
| | BPE-500 | 11.988 | 4.996 | 9.99 | 9.993 | 9.993 | 9.99 |
| | BPE-900 | | | | | | |
| POLYMERIZATION INHIBITOR | BHT | 0.03 | 0.033 | 0.03 | 0.03 | 0.03 | 0.03 |
| SUM | | 100 | 100 | 100 | 100 | 100 | 100 |
| SECOND AGENT | | A | A | B | A | A | A |
| ADHESIVENESS TO DENTIN OF CURED PRODUCT [MPa] | | 6.4 | 7.7 | 6.7 | 6.2 | 7.5 | 7.2 |
| DETERMINATION | | EXCELLENT | EXCELLENT | EXCELLENT | EXCELLENT | EXCELLENT | EXCELLENT |
| FLEXURAL STRENGTH OF CURED PRODUCT [MPa] | | 43.1 | 49.0 | 42.8 | 43.0 | 51.0 | 44.0 |
| DETERMINATION | | EXCELLENT | EXCELLENT | EXCELLENT | EXCELLENT | EXCELLENT | EXCELLENT |

| | | COMPARATIVE EXAMPLE | | | | | |
|---|---|---|---|---|---|---|---|
| | | 1 | 2 | 3 | 4 | 5 | 6 |
| FORMULATION OF FIRST AGENT [% BY MASS] | | | | | | | |
| IONOMER GLASS POWDER | A | 70 | | | | | 70 |
| | B | | 70 | | | | |
| | C | | | 75 | 70 | 70 | |
| WATER-SOLUBLE COMPOUND REPRESENTED BY GENERAL FORMULA (1) | HEMA | 14.985 | 6.994 | 2.997 | | 6.994 | |
| | HEAA | | | | | | |
| WATER-SOLUBLE COMPOUND REPRESENTED BY GENERAL FORMULA (2) | BPE-1300N | | | | | | |
| | UA-7100 | | | | 1.998 | | |
| WATER-SOLUBLE COMPOUND REPRESENTED BY GENERAL FORMULA (3) | UDMA | 4.995 | 4.996 | 6.993 | 4.996 | 4.996 | 4.995 |
| | TEGDMA | 4.995 | 5.989 | | 5.989 | 5.989 | |
| | GDMA | | | | | | 14.985 |
| | BPE-500 | 4.995 | 11.991 | 14.985 | 16.987 | 9.993 | 9.99 |
| | BPE-900 | | | | | 1.998 | |
| POLYMERIZATION INHIBITOR | BHT | 0.03 | 0.03 | 0.025 | 0.03 | 0.03 | 0.03 |
| SUM | | 100 | 100 | 100 | 100 | 100 | 100 |
| SECOND AGENT | | A | A | B | B | B | A |
| ADHESIVENESS TO DENTIN OF CURED PRODUCT [MPa] | | 4.5 | 4.5 | 1.0 | 3.8 | 1.2 | 0.5 |
| DETERMINATION | | POOR | POOR | POOR | POOR | POOR | POOR |
| FLEXURAL STRENGTH OF CURED PRODUCT [MPa] | | 34.0 | 43.5 | 52.0 | 41.9 | 46.0 | 32.0 |
| DETERMINATION | | POOR | EXCELLENT | EXCELLENT | EXCELLENT | EXCELLENT | POOR |

From Table 1, it can be seen that the cured product of each glass ionomer cement of Examples 1 to 6 has high adhesiveness to the dentin and flexural strength.

In contrast, the cured product of each glass ionomer cement of Comparative Examples 1 to 3 and 5 has low adhesiveness to the dentin because the first agent does not contain a water-soluble compound represented by general formula (2).

The cured product of the glass ionomer cement of Comparative Example 4 has low adhesiveness to the dentin because the first agent does not contain a water-soluble compound represented by general formula (1).

The cured product of the glass ionomer cement of Comparative Example 6 has low adhesiveness to the dentin and flexural strength because the first agent does not contain any of the water-soluble compound represented by general formula (1) and the water-soluble compound represented by general formula (2).

The invention claimed is:

1. A dental glass ionomer cement comprising:
   a first agent containing an ionomer glass powder and glycerin dimethacrylate; and
   a second agent containing a polycarboxylic acid polymer and water,
   wherein the first agent further contains a water-soluble compound represented by general formula (1):

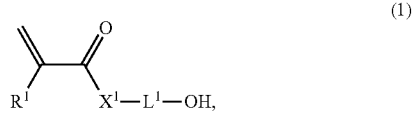

(1)

where $R^1$ is a hydrogen atom or a methyl group, $X^1$ is —O— or —NH—, and $L^1$ is an alkylene group, and
   wherein the first agent further contains a water-soluble compound represented by general formula (2-1):

(2-1)

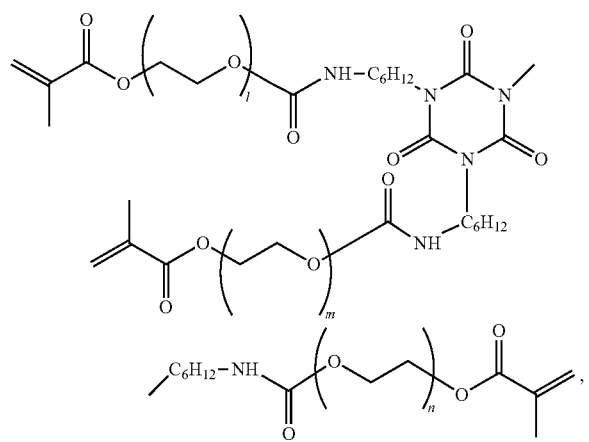

where the sum of l, m, and n is 15 or more and 45 or less, and/or a water-soluble compound represented by general formula (2-2):

(2-2)

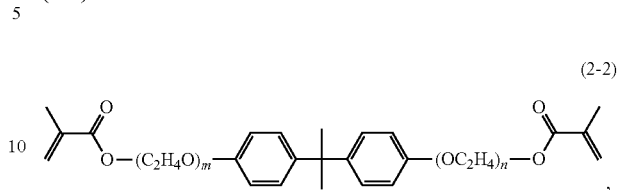

where the sum of m and n is 30 or more and 40 or less.

2. The dental glass ionomer cement according to claim 1, wherein a solubility in water at 20° C. of the water-soluble compound represented by general formula (1) and the water-soluble compound represented by general formulae (2-1) and (2-2) is 10 g/100 g $H_2O$ or more.

* * * * *